United States Patent
Bush et al.

(10) Patent No.: US 12,129,442 B2
(45) Date of Patent: Oct. 29, 2024

(54) POLYACRYLATE ANTIFOAM COMPONENTS FOR USE IN FUELS

(71) Applicant: The Lubrizol Corporation, Wickliffe, OH (US)

(72) Inventors: James H. Bush, Mentor, OH (US); David M. Nickerson, Concord Township, OH (US); Rochelle L. Kovach, Cleveland, OH (US); Jayasooriya Sujith Perera, Twinsburg, OH (US); Elizabeth A. Schiferl, Chagrin Falls, OH (US); Kevin J. Hughes, Sammamish, WA (US); Kamalakumari K. Salem, Mentor, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 17/569,172

(22) Filed: Jan. 5, 2022

(65) Prior Publication Data
US 2022/0259511 A1 Aug. 18, 2022

Related U.S. Application Data

(62) Division of application No. 16/649,442, filed as application No. PCT/US2018/052168 on Sep. 21, 2018, now abandoned.
(Continued)

(51) Int. Cl.
*C10L 1/196* (2006.01)
*C08F 220/18* (2006.01)
(Continued)

(52) U.S. Cl.
CPC ...... *C10L 1/1963* (2013.01); *C08F 220/1804* (2020.02); *C10L 1/1983* (2013.01);
(Continued)

(58) Field of Classification Search
CPC .... C10L 1/1963; C10L 1/1983; C10L 1/2222; C10L 2200/0446; C10L 2230/082; C08F 220/1804
See application file for complete search history.

(56) References Cited

U.S. PATENT DOCUMENTS

| | | | | |
|---|---|---|---|---|
| 3,166,508 A | * | 1/1965 | Fields | C10M 145/16 508/448 |
| 2006/0240999 A1 | * | 10/2006 | Placek | C10M 145/14 508/472 |
| 2009/0064568 A1 | * | 3/2009 | Stohr | C10L 1/1963 44/308 |

* cited by examiner

*Primary Examiner* — Latosha Hines
(74) *Attorney, Agent, or Firm* — Iken S. Sans; Michael A. Miller

(57) ABSTRACT

There is disclosed an antifoam component which includes at least one poly(acrylate) copolymer for use in a fuel. Poly(acrylate) polymers prepared by polymerizing a (meth)acrylate monomer comprising $C_1$ to $C_{30}$ alkyl esters of (meth)acrylic acid ("multifunctional monomer") are also disclosed. Other poly(acrylate) polymers prepared by polymerizing (i) a (meth)acrylate monomer comprising $C_1$ to $C_4$ alkyl esters of (meth)acrylic acid ("solubility monomer"); (ii) a (meth)acrylate monomer comprising $C_5$ to $C_{12}$ alkyl esters of (meth)acrylic acid ("surface tension monomer"); and (iii) optionally at least one additional monomer comprising a solubility monomer, a surface tension monomer, a monomer comprising $C_1$ to $C_{30}$ alkyl esters of (meth)acrylic acid ("multifunctional monomer"), or combinations thereof are also disclosed.

3 Claims, 4 Drawing Sheets

Related U.S. Application Data

(60) Provisional application No. 62/653,621, filed on Apr. 6, 2018, provisional application No. 62/646,127, filed on Mar. 21, 2018, provisional application No. 62/561,342, filed on Sep. 21, 2017.

(51) Int. Cl.
 *C10L 1/198* (2006.01)
 *C10L 1/222* (2006.01)

(52) U.S. Cl.
 CPC ..... *C10L 1/2222* (2013.01); *C10L 2200/0446* (2013.01); *C10L 2230/082* (2013.01)

POLYACRYLATE ANTIFOAM COMPONENTS FOR USE IN FUELS

CROSS REFERENCE TO RELATED APPLICATION

This application is a divisional application based on U.S. patent application Ser. No. 16/649,442, filed on Mar. 20, 2020, which claims priority from PCT Application Serial No. PCT/US2018/052168 filed on Sep. 21, 2018, which claims the benefit of U.S. Provisional Application No. 62/653,621 filed on Apr. 6, 2018, which claims the benefit of U.S. Provisional Application No. 62/646,127 filed on Mar. 21, 2018, which claims the benefit of U.S. Provisional Application No. 62/561,342 filed on Sep. 21, 2017, all of which are incorporated in their entirety by reference herein.

BACKGROUND

The disclosed technology relates to compounds that are useful as antifoam components in diesel fuels. In particular, diesel fuel compositions and concentrates comprising said antifoam components and the use of same are disclosed.

Diesel fuel has a tendency to foam and is particularly problematic at point of sale applications when diesel fuel is pumped into the tank of a vehicle ("fill-ups"). As the diesel fuel is pumped into the tank, a large amount of foam is quickly generated thereby greatly reducing the amount of diesel that can be pumped into a tank at each fill-up.

Reducing the amount of foam produced during fill-ups would greatly increase the volume capacity of diesel tanks, but there are no viable antifoam options for the North American market. Currently, only nitrogen, oxygen, carbon and/or hydrogen ("NOCH") based chemistries are allowed in North American diesel applications. This precludes known silicone antifoams as a viable option. Some fluorinated (poly)acrylate antifoams have been shown to function as antifoams in diesel fuel, however fluorine is also prevented in diesel additives. Thus, there is a need for non-silicone, fluorine-free antifoam for diesel fuel.

SUMMARY OF THE INVENTION

Compositions comprising poly(acrylate) polymers prepared by polymerizing certain (meth)acrylate monomers have surprisingly shown to be effective antifoams in fuels. These (meth)acrylate monomers include (meth)acrylate monomers comprising $C_1$ to $C_{30}$ alkyl esters of (meth)acrylic acid ("multifunctional monomers"). In some embodiments, the multifunctional monomer may comprise $C_2$ to $C_{27}$ alkyl esters of (meth)acrylic acid. The poly(acrylate) polymer may have a weight average molecular weight ("$M_w$") ranging from 10,000 to 350,000 Daltons ("Da") or 20,000 to 200,000 Da. In yet other embodiments, the poly(acrylate) polymers may be homopolymers.

In other embodiments, the multifunctional monomers may comprise $C_2$ to $C_{12}$ alkyl esters of (meth)acrylic acid. Exemplary multifunctional monomers include, but are not limited to, monomers comprising tertiary butyl (meth)acrylate.

In some embodiments, a composition comprising at least one poly(acrylate) polymer is prepared by polymerizing: (i) a (meth)acrylate monomer comprising $C_1$ to $C_4$ alkyl esters of (meth)acrylic acid ("solubility monomer"); (ii) a (meth)acrylate monomer comprising $C_5$ to $C_{12}$ alkyl esters of (meth)acrylic acid ("surface tension monomer"); and (iii) optionally at least one additional monomer that may comprise a solubility monomer, surface tension monomer, a monomer having $C_1$ to $C_{30}$ alkyl esters of (meth)acrylic acid ("multifunctional monomer"), or combinations thereof. In other embodiments, poly(acrylate) polymer may be polymerized using: (i) from 5 wt % to 95 wt % of the solubility monomer; (ii) from 95 wt % to 5 wt % of the surface tension monomer; and (iii) optionally from 2 wt % to 10 wt % of the at least one additional monomer.

In some embodiments, the poly(acrylate) polymer may be at least one of a copolymer, block polymer, random polymer, terpolymer, or combinations thereof. In some embodiments, the poly(acrylate) polymer may have a $M_w$ of from 20,000 to 200,000 Da, 20,000 to 80,000 Da, or 30,000 to 40,000 Da.

In some embodiments, the composition may comprise a poly(acrylate) polymer comprising units with the structure of formula (I):

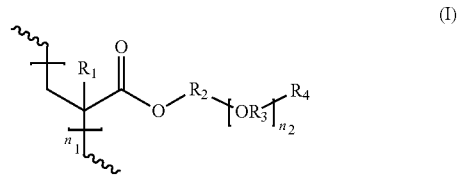

wherein $R^1$ is H or $CH_3$; $R^2$ is a $C_2$ to $C_{10}$ linear, branched or cyclic hydrocarbyl group; $R^3$ is a $C_2$ to $C_4$ linear or branched hydrocarbyl group; $R^4$ is H, OH, or $CH_3$; $n_1$ is an integer ranging from 75 to 3000; and $n_2$ is an integer ranging from 0 to 3. In some embodiments, $R^2$ and/or $R^3$ is branched. In other embodiments, $R^2$ is linear and $R^3$ is branched.

In some embodiments, the multifunctional monomer and/or solubility monomer may comprise $C_1$-$C_4$ alkyl esters of (meth)acrylic acid. In other embodiments the multifunctional monomer and/or surface tension monomer may comprise $C_5$-$C_{12}$ alkyl esters of (meth)acrylic acid. In some embodiments, the multifunctional monomer and/or solubility monomer may comprise tertiary butyl (meth)acrylate, ethyl (meth)acrylate, or combinations thereof. In other embodiments, the multifunctional monomer and/or the surface tension monomer may comprise tertiary butyl (meth)acrylate. In yet other embodiments, the solubility monomer may comprise tertiary butyl (meth)acrylate, ethyl (meth)acrylate, or combinations thereof, and the surface tension monomer may comprise trimethylhexyl (meth)acrylate, 2-ethylhexyl (meth)acrylate, or combinations thereof. In one embodiment, the solubility monomer may comprise tertiary butyl (meth)acrylate and the surface tension monomer may comprise 2-ethylhexyl (meth)acrylate.

The poly(acrylate) polymers described above may be added to a fuel to reduce the amount of foam produced in the fuel. The poly(acrylate) polymer may be present in the fuel in an amount from 0.1 ppm to 2000 ppm by weight, or 2 ppm to 100 ppm, based on a total weight of the fuel composition. Accordingly, methods of reducing foam in a diesel are also disclosed. In some embodiments, the fuel may be a diesel fuel. The use of at least one poly(acrylate) polymer to reduce a foam in a fuel, typically diesel, is also disclosed.

Methods of reducing the amount of foam produced while filing the diesel tank of a vehicle are also disclosed. The method may comprise adding at least one poly(acrylate) polymer prepared by polymerizing a (meth)acrylate monomer to a fuel. The poly(acrylate) polymer may be as described above.

Fuel additive packages and their uses are also disclosed herein. The fuel additive package may comprise: (i) at least one quaternary ammonium salt; (ii) at least one hydrolyzed polyisobutylene succinic anhydride (PIB SA), polyisobutylene succinic acid, or combinations thereof; (iii) at least one demulsifier; (iv) at least one antifoam component as described above; (v) optionally, at least one cetane improver; and (vi) optionally, at least one solvent comprising an aromatic solvent, ethyl hexyl alcohol, or combinations thereof. Methods of reducing foam in a fuel comprising adding the fuel additive package described above to a fuel are also disclosed.

DETAILED DESCRIPTION OF THE INVENTION

Various preferred features and embodiments will be described below by way of non-limiting illustration.

Figure 1:
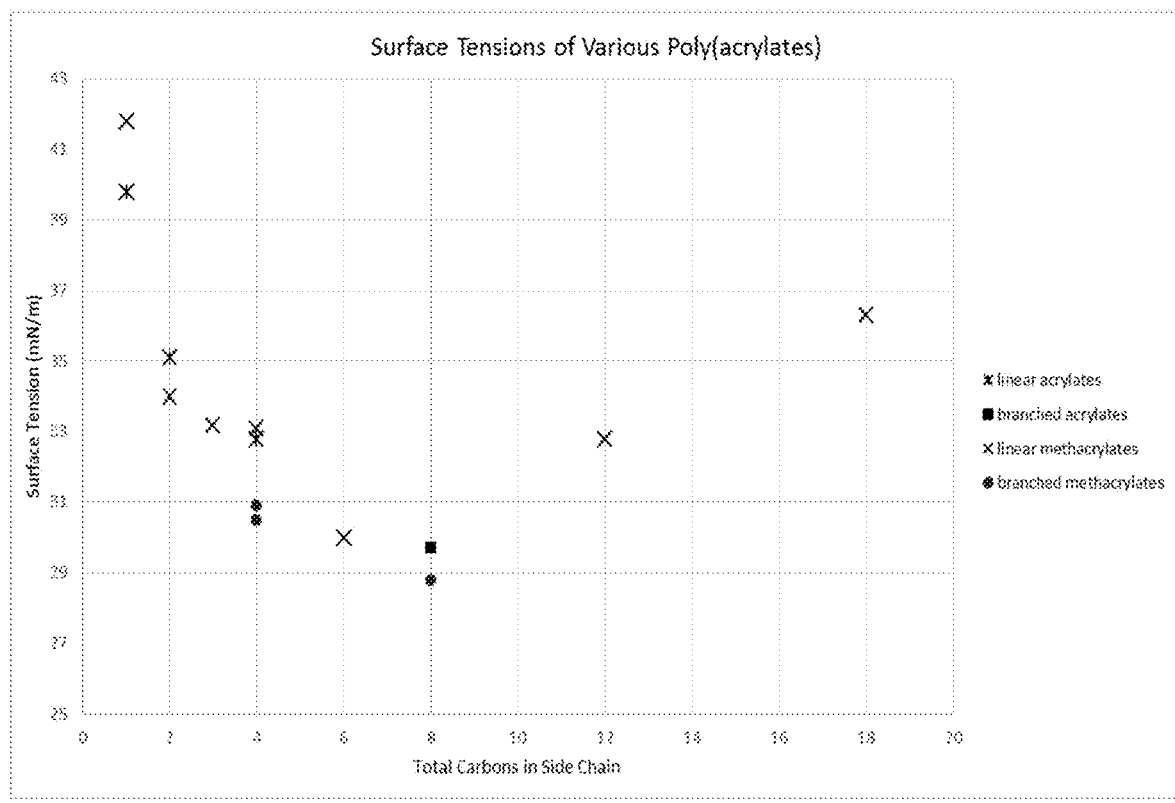
FIG. 1 is a graph showing the surface tensions of various poly(acrylates) having different carbon chain lengths.

The disclosed technology provides a composition including an antifoam component which includes a poly(acrylate) copolymer. Without limiting this disclosure to the theory of operation disclosed herein, it is believed that antifoam components break foam bubbles by adsorbing on the surface of the bubbles and lowering their surface tension. It is further believed the effectiveness of antifoam components in a given fluid is a function of two factors relative to the bulk fluid. The first factor is the component's solubility in the bulk fluid. Generally, antifoams that have poor solubility (insoluble or almost insoluble) in a fluid will have improved performance than easily soluble antifoams. The second factor is the component's surface tension. Generally, antifoam components having a lower surface tension are more effective as antifoam components than components having a higher surface tension. FIG. 1 is a graph showing the surface tensions of various poly(acrylates) having different carbon chain lengths.

Traditionally, copolymers of 2-ethylhexyl (meth)acrylate (EHAT or EHMA) and ethyl (meth)acrylate (EAT or EMA) have been used to prepare poly(acrylate) polymers in many organic fluids. This two-monomer system can be tailored for the fluid at hand by adjusting the monomer ratio as follows: a greater percentage of EAT leads to decreased solubility while a greater percentage of EHAT leads to decreased surface tension.

For diesel fuels, however, EHAT/EAT based poly(acrylate) polymers having a molecular weight ($M_w$) of 40,000 to 100,000 Da were not effective antifoam components because there was no combination that provided both the required surface tension as well as the required solubility properties. For example, the minimum EAT content needed in the poly(acrylate) polymer to impart diesel fuel insolubility was 55 wt %. At this level, however, the antifoam's surface tension properties are incompatible with diesel fuel. Similarly, at 100 wt %, EHAT based polymers formulations have sufficiently low surface tension to be active in diesel but are too soluble and fail to form the necessary antifoam droplets.

It was surprisingly found, however, that the solubility and surface tension poly(acrylate) polymers could be varied not only by the amount of (meth)acrylate monomers used, but by the (meth)acrylate monomer type. The selection of certain (meth)acrylate monomers could help drive the solubility properties or surface tension properties of a resulting poly (acrylate) polymer in a desired direction.

As used herein, the term "poly(acrylate) polymers" are polymers derived from monomers comprising alkyl esters of (meth)acrylic acids. Poly(acrylate) polymers are commonly referred to as polyacrylates or acrylics. The terms "(meth) acrylic acid", "(meth)acrylate" and related terms include both acrylate and methacrylate groups, i.e. the methyl group is optional. For example, the term (meth)acrylic acid includes acrylic acid and methacrylic acid. Accordingly, in some embodiments, a (meth)acrylate or acrylate may comprise at least one acrylate, acrylic acid, methacrylate, methacrylic acid, or combinations thereof.

When referring to a specified monomer(s) that is incorporated or used to prepare a poly(acrylate) polymer disclosed herein, the ordinarily skilled person will recognize that the monomer(s) will be incorporated as at least one unit into the poly(acrylate) polymer.

It was surprisingly found that (meth)acrylate monomers having $C_1$ to $C_{30}$ alkyl esters of (meth)acrylic acid resulted in poly(acrylate) polymers having both solubility and surface tension properties to make them effective antifoam components in fuels, such as diesel fuels. As such, these (meth)acrylate monomers having $C_1$ to $C_{30}$ alkyl esters of (meth)acrylic acid are referred to herein as "multifunctional monomers". Accordingly, compositions comprising a fuel and at least one poly(acrylate) polymer prepared by polymerizing (meth)acrylate monomers comprising $C_1$ to $C_{30}$ alkyl esters of (meth)acrylic acid ("multifunctional monomers") are disclosed. Exemplary multifunction monomers include tertiary butyl (meth)acrylate, ethyl (meth)acrylate.

As used herein, $C_x$ to $C_y$, when used to describe the alkyl esters of (meth)acrylic acid, refers to the number of carbon atoms in the alkyl group connected to the oxygen on the (meth)acrylate moiety and does not include the number of carbon atoms in the (meth)acrylate moiety itself.

In some embodiments, the multifunctional monomer may comprise $C_2$ to $C_{27}$ alkyl esters of (meth)acrylic acid. In other embodiments, the multifunctional monomers may comprise $C_2$ to $C_{12}$, or $C_2$, $C_3$, $C_4$, $C_5$, $C_6$, $C_7$, $C_8$, $C_9$, $C_{10}$, $C_{11}$, or $C_{12}$ alkyl esters of (meth)acrylic acid. Exemplary multifunctional monomers include, but are not limited to, monomers comprising tertiary butyl (meth)acrylate or 3,3-dimethylbutyl(meth)acrylate, neopentyl(meth)acrylate, or combinations thereof. In yet other embodiments, the poly (acrylate) polymers made from the multifunctional monomers may be homopolymers. The compositions may comprise at least 80 wt %, 85 wt %, 90 wt %, 95 wt %, 98 wt % or 100 wt % of a multifunctional monomer. In some embodiments the compositions may comprise at least 80 wt % of a multifunctional monomer and 20 wt % or less of a solubility monomer, surface tension monomer, or combinations thereof. In yet other embodiments, the ratio of the multifunctional monomer to the solubility monomer, surface tension monomer, or combinations thereof may be 85:15, 90:10, 95:05, or 98:02.

Yet other (meth)acrylate monomers were found to affect primarily only one factor of the resulting poly(acrylate) polymers. The (meth)acrylate monomers that primarily affect the solubility of the resulting poly(acrylate) polymers are referred to herein as "solubility" monomers. These solubility monomers are (meth)acrylate monomers comprising $C_1$ to $C_4$ alkyl esters of (meth)acrylic acid Exemplary solubility monomers include, but are not limited to, methyl (meth)acrylate, ethyl (meth)acrylate, (meth)acrylic acid, 2-hydroxyethyl (meth)acrylate, polyalkylene glycol ("PAG") (meth)acrylate, and combinations thereof.

Similarly, (meth)acrylate monomers that primarily affect the surface tension of the resulting poly(acrylate) polymers are referred to herein as "surface tension" monomers. These surface tension monomers are (meth)acrylate monomers comprising $C_5$ to $C_{12}$ alkyl esters of (meth)acrylic acid. Exemplary surface tension monomers include, but are not limited to, 2-ethylhexyl (meth)acrylate, 3,5,5-trimethylhexyl (meth)acrylate, and combinations thereof.

Accordingly, compositions comprising at least one poly(acrylate) polymer prepared by polymerizing both solubility monomers and surface tension monomers are also disclosed. In some embodiments, the poly(acrylate) polymer may be prepared by polymerizing (i) a (meth)acrylate monomer comprising $C_1$ to $C_4$ alkyl esters of (meth)acrylic acid ("solubility monomer"); (ii) a (meth)acrylate monomer comprising $C_5$ to $C_{12}$ alkyl esters of (meth)acrylic acid ("surface tension monomer"); and (iii) optionally at least one additional monomer that may comprise a solubility monomer, surface tension monomer, a monomer having $C_1$ to $C_{30}$ alkyl esters of (meth)acrylic acid ("multifunctional monomer"), or combinations thereof.

In other embodiments, poly(acrylate) polymer may be polymerized using: (i) from 5 wt % to 95 wt % of the solubility monomer; (ii) from 95 wt % to 5 wt % of the surface tension monomer; and (iii) optionally from 2 wt % to 10 wt % of the at least one additional monomer. Exemplary ratios of the solubility:surface tension:additional monomer include, but are not limited to, 80:15:5; 80:10:10, 80:5:15, 85:10:5, 85:5:10, and combinations in between. In some embodiments, the ratios may be 85:11:4 or 85:4:11.

The poly(acrylate) polymer may be at least one of a copolymer, block polymer, random polymer, terpolymer, or combinations thereof. In some embodiments, the poly(acrylate) polymer antifoam component employed herein generally will have a weight average molecular weight ($M_w$) of at least 13,000 Da. In some embodiments, the poly(acrylate) polymer may have a $M_w$ of from 10,000 to 350,000 Da, or 20,000 to 200,000 Da. In yet other embodiments, the poly(acrylate) polymer may have a $M_w$ of from 20,000 to 80,000 Da or 30,000 to 40,000 Da.

As used herein, the weight average molecular weight ($M_w$) is measured using gel permeation chromatography ("GPC") (Waters Alliance e2695) based on polystyrene standards. The instrument is equipped with a refractive index detector and Waters Empower™ data acquisition and analysis software. The columns are polystyrene/divinylbenzene (PLgel, (3 "Mixed-C" and one 100 Angstrom, 5 micron particle size), available from Agilent Technologies). For the mobile phase, individual samples are dissolved in tetrahydrofuran and filtered with PTFE filters before they are injected into the GPC port.

Waters Alliance e2695 Operating Conditions:
Column Temperature: 40° C.
Autosampler Control: Run time: 45 minutes
Injection volume: 300 microliter
Flow rate: 1.0 ml/minute
Differential Refractometer (RI) (2414): Sensitivity: 16; Scale factor: 20

Persons ordinarily skilled in the art will understand that the number average molecular weight ("$M_n$") may be measured using a similar technique to the one described above.

The poly(acrylate) polymer antifoam components disclosed herein can be prepared by methods generally known in the art. The polymerization may be affected in mass, emulsion or solution in the presence of a free-radical liberating agent as catalyst and in the presence or absence of known polymerization regulators. In one embodiment, the antifoam can be polymerized in the presence of a solvent. The solvent may be aliphatic (such as heptanes) or aromatic (such as xylene or toluene). In another embodiment, the antifoam can be polymerized in a hydrocarbon oil. In yet other embodiments, the antifoam may be polymerized in light aromatic petroleum naphtha, heavy aromatic naphtha, or combinations thereof.

In some embodiments, the poly(acrylate) polymer may comprise units with the structure of formula (I):

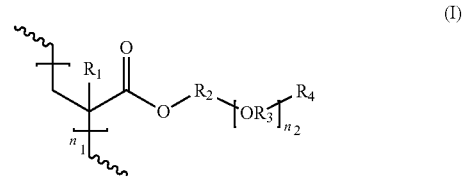

(I)

wherein $R^1$ is H or $CH_3$; $R^2$ is a $C_2$ to $C_{10}$ linear, branched, or cyclic hydrocarbyl group; $R^3$ is a $C_2$ to $C_4$ linear or branched hydrocarbyl group; $R^4$ is H, OH, or $CH_3$; $n_1$ is an integer ranging from 75 to 3000; and $n_2$ is an integer ranging from 0 to 3.

In some embodiments, $R^2$ and/or $R^3$ is branched. In other embodiments, $R^2$ is linear and $R^3$ is branched.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include: hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring); substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy);

hetero substituents, that is, substituents which, while having a predominantly hydrocarbon character, in the context of this invention, contain other than carbon in a ring or chain otherwise composed of carbon atoms and encompass substituents as pyridyl, furyl, thienyl and imidazolyl. Heteroatoms include sulfur, oxygen, and nitrogen. In general, no more than two, or no more than one, non-hydrocarbon substituent will be present for every ten carbon atoms in the hydrocarbyl group; alternatively, there may be no non-hydrocarbon substituents in the hydrocarbyl group. In one embodiment, there are no halo substituents in the hydrocarbyl group.

The surface tension of the poly(acrylate) polymer varies with the number of carbon atoms in the (meth)acrylate monomer used to make the polymer. In some embodiments, the surface tension monomer may comprise $C_7$, $C_8$, $C_9$, $C_{10}$, $C_{11}$, or $C_{12}$ alkyl esters of (meth)acrylic acid. In some embodiments, the surface tension monomer may comprise $C_9$ alkyl esters of (meth)acrylic acid. It was further found that the surface tension monomers having branched alkyl groups tended to result in poly(acrylate) polymers with lower surface tension properties than monomers having the same number of carbon atoms in a linear configuration. Accordingly, in some embodiments, $R^2$ and/or $R^3$ may be branched. In other embodiments, $R^2$ may be linear and $R^3$ may be branched. The (meth)acrylate monomers having the lowest surface tension for a given carbon number tended to comprise a neopentyl group having the structure of formula (II):

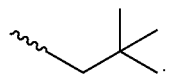

(II)

Accordingly, in some embodiments (meth)acrylate monomers comprising a terminal neopentyl group are disclosed. Exemplary monomers include, but are not limited to, monomers comprising 2,2-dimethylheptane, 2,2,4-trimethylhexane, 2,2,4,4-tetramethylpentane, 2,2,5-trimethylhexane, and combinations thereof as terminal neopentyl groups. In yet another embodiment, the surface tension monomer may comprise $C_9$ alkyl esters of (meth)acrylic acid having a terminal neopental group.

In some embodiments, the multifunctional monomer and/or solubility monomer may comprise $C_1$-$C_4$ alkyl esters of (meth)acrylic acid. In other embodiments the multifunctional monomer and/or surface tension monomer may comprise $C_5$-$C_{12}$ alkyl esters of (meth)acrylic acid. In some embodiments, the multifunctional monomer and/or solubility monomer may comprise tertiary butyl (meth)acrylate. In other embodiments, the multifunctional monomer and/or the surface tension monomer may comprise tertiary butyl (meth)acrylate. In yet other embodiments, the solubility monomer may comprise tertiary butyl (meth)acrylate and the surface tension monomer may comprise trimethylhexyl (meth)acrylate. In one embodiment, the solubility monomer may comprise tertiary butyl (meth)acrylate and the surface tension monomer may comprise 2-ethylhexyl (meth)acrylate. The ratio of the multifunctional and/or solubility monomer to the surface tension monomer is not overly limited. In some embodiments, the ratio may range from 98:2, 95:5, 90:10, 85:15, or 80:10.

In yet other embodiments, a composition comprising at least two poly(acrylate) polymers is disclosed. The composition may comprise a first poly(acrylate) polymer prepared by polymerizing a (meth)acrylate monomer comprising $C_1$ to $C_{30}$ alkyl esters of (meth)acrylic acid ("multifunctional monomer") and a second poly(acrylate) polymer prepared by polymerizing: (i) a (meth)acrylate monomer comprising $C_1$ to $C_4$ alkyl esters of (meth)acrylic acid ("solubility monomer"); (ii) a (meth)acrylate monomer comprising $C_5$ to $C_{12}$ alkyl esters of (meth)acrylic acid ("surface tension monomer"); and (iii) optionally at least one additional monomer comprising a solubility monomer, a surface tension monomer, a monomer comprising $C_1$ to $C_{30}$ alkyl esters of (meth)acrylic acid ("multifunctional monomer"), or combinations thereof.

The poly(acrylate) polymers described above may be added to a fuel to reduce the amount of foam produced in the fuel. In some embodiments, the fuel may comprise diesel. The poly(acrylate) polymer may be present in the fuel in an amount from 0.1 ppm to 3000 ppm by weight, or 1 ppm to 100 ppm, or 75 to 1500 ppm, or even 500 to 3000 ppm by weight, based on a total weight of the fuel composition. Accordingly, methods of reducing foam in a fuel are also disclosed. The use of a poly(acrylate) polymer to reduce a foam in a fuel is also disclosed.

Methods of reducing the amount of foam produced while filing the fuel tank of a vehicle are also disclosed. The method may comprise adding a poly(acrylate) polymer prepared by polymerizing a (meth)acrylate monomer to a fuel. The poly(acrylate) polymer may be as described above.

Fuel and Fuel Compositions

The fuel compositions described herein can comprise a fuel which is liquid at room temperature and is useful in fueling an engine. The fuel is normally a liquid at ambient conditions e.g., room temperature (20 to 30° C.). The fuel can be a hydrocarbon fuel, a nonhydrocarbon fuel, or a mixture thereof. The hydrocarbon fuel can be a diesel fuel as defined by EN590 or ASTM specification D975. The hydrocarbon fuel can be a hydrocarbon prepared by a gas to liquid process to include for example hydrocarbons prepared by a process such as the Fischer-Tropsch process. Accordingly, in some embodiments, the fuel may be a gas to liquid ("GTL") diesel, biomass to liquid ("BTL") fuel, or combinations thereof.

The nonhydrocarbon fuel can include, transesterified oils and/or fats from plants and animals such as rapeseed methyl ester and soybean methyl ester. Mixtures of hydrocarbon and nonhydrocarbon fuels can include for example, diesel fuel and ethanol, and diesel fuel and a transesterified plant oil such as rapeseed methyl ester. In an embodiment of the invention the liquid fuel is an emulsion of water in a hydrocarbon fuel, a nonhydrocarbon fuel, or a mixture thereof.

In some embodiments, the fuel may comprise a hydrotreated vegetable oil ("HVO"), commonly called a renewable diesel. In other embodiments, the fuel may comprise mixtures of diesel and HVO. In yet other embodiments the fuel can comprise blends of biodiesel and diesel, blends of HVO and diesel, or blends of HVO and biodiesel.

In several embodiments, the fuel can have a sulfur content on a weight basis that is 5000 ppm or less, 1000 ppm or less, 300 ppm or less, 200 ppm or less, 30 ppm or less, or 10 ppm or less. In another embodiment the fuel can have a sulfur content on a weight basis of 1 to 100 ppm.

The fuel is present in a fuel composition in a major amount that is generally greater than 50 percent by weight, and in other embodiments is present at greater than 90 percent by weight, greater than 95 percent by weight, greater than 99.5 percent by weight, or greater than 99.8 percent by weight. The fuel composition may comprise one or more fuel additives as described below.

In some embodiments, the fuel composition may comprise at least one combustion improver. Combustion improvers include for example octane and cetane improvers. Suitable cetane number improvers are, for example, aliphatic nitrates such as 2-ethylhexyl nitrate and cyclohexyl nitrate and peroxides such as di-tert-butyl peroxide.

In a yet another embodiment, the fuel composition comprises antifoam components of the disclosed technology as described above and at least one demulsifier.

Suitable demuslifiers can include, but are not limited to, arylsulfonates and polyalkoxylated alcohol, such as, for example, polyethylene and polypropylene oxide copolymers and the like. The demulsifiers can also comprise nitrogen containing compounds such as oxazoline and imidazoline compounds and fatty amines, as well as Mannich compounds. Mannich compounds are the reaction products of alkylphenols and aldehydes (especially formaldehyde) and amines (especially amine condensates and polyalkylenepolyamines). The materials described in the following U.S. Patents are illustrative: U.S. Pat. Nos. 3,036,003; 3,236,770; 3,414,347; 3,448,047; 3,461,172; 3,539,633; 3,586,629; 3,591,598; 3,634,515; 3,725,480; 3,726,882; and 3,980,569 herein incorporated by reference. Other suitable demulsifiers are, for example, the alkali metal or alkaline earth metal salts of alkyl-substituted phenol- and naphthalenesulfonates and the alkali metal or alkaline earth metal salts of fatty acids, and also neutral compounds such as alcohol alkoxylates, e.g. alcohol ethoxylates, phenol alkoxylates, e.g. tert-butylphenol ethoxylate or tert-pentylphenol ethoxylate, fatty acids, alkylphenols, condensation products of ethylene oxide (EO) and propylene oxide (PO), for example including in the form of EO/PO block copolymers, polyethyleneimines or else polysiloxanes. Any of the commercially available demulsifiers may be employed, suitably in an amount sufficient to provide a treat level of from 5 to 50 ppm in the fuel. In one embodiment the fuel composition of the invention does not comprise a demulsifier. The demulsifiers may be used alone or in combination. Some demulsifiers are commercially available, for example from Nalco or Baker Hughes. Typical treat rates of the demulsifiers to a fuel may range from 0 to 50 ppm by total weight of the fuel, or 5 to 50 ppm, or 5 to 25 ppm, or 5 to 20 ppm.

The disclosed technology may also be used with demulsifiers comprising a hydrocarbyl-substituted dicarboxylic acid in the form of the free acid, or in the form of the anhydride which may be an intramolecular anhydride, such as succinic, glutaric, or phthalic anhydride, or an intermolecular anhydride linking two dicarboxylic acid molecules together. The hydrocarbyl substituent may have from 12 to 2000 carbon atoms and may include polyisobutenyl substituents having a number average molecular weight of 300 to 2800. Exemplary hydrocarbyl-substituted dicarboxylic acids include, but are not limited to, hydrocarbyl-substituted acids derived from malonic, succinic, glutaric, adipic, pimelic, suberic, azelaic, sebacic, undecanedioic, dodecanedioic, phthalic, isophthalic, terphthalic, ortho, meta, or paraphenylene diacetic, maleic, fumaric, or glutaconic acids.

In another embodiment, the fuel compositions further comprise at least one detergent/dispersant. Customary detergent/dispersant additives are amphiphilic substances which possess at least one hydrophobic hydrocarbon radical with a number average molecular weight of 100 to 10000 and at least one polar moiety selected from (i) Mono- or polyamino groups having up to 6 nitrogen atoms, at least one nitrogen atom having basic properties; (ii) Hydroxyl groups in combination with mono or polyamino groups, at least one nitrogen atoms having basic properties; (iii) Carboxyl groups or their alkali metal or alkaline earth metal salts; (iv) Sulfonic acid groups or their alkali metal or alkaline earth metal salts; (v) Polyoxy-$C_2$ to $C_4$ alkylene moieties terminated by hydroxyl groups, mono- or polyamino groups, at least one nitrogen atom having basic properties, or by carbamate groups; (vi) Carboxylic ester groups; (vii) Moieties derived from succinic anhydride and having hydroxyl and/or amino and/or amido and/or imido groups; and/or (viii) Moieties obtained by Mannich reaction of substituted phenols with aldehydes and mono- or polyamines.

The hydrophobic hydrocarbon radical in the above detergent/dispersant additives which ensures the adequate solubility in the fuel, has a number average molecular weight ($M_n$) of 85 to 20,000, or 100 to 10,000, or 300 to 5000. In yet another embodiment, the detergent/dispersant additives have a $M_n$ of 300 to 3000, of 500 to 2500, of 700 to 2500, or 800 to 1500. Typical hydrophobic hydrocarbon radicals, may be polypropenyl, polybutenyl and polyisobutenyl radicals, with a number average molecular weight $M_n$, of 300 to 5000, of 300 to 3000, of 500 to 2500, or 700 to 2500. In one embodiment the detergent/dispersant additives have a $M_n$ of 800 to 1500.

The additional performance additives may comprise a high TBN nitrogen containing detergent/dispersant, such as a succinimide, that is the condensation product of a hydrocarbyl-substituted succinic anhydride with a poly(alkyleneamine). Succinimide detergents/dispersants are more fully described in U.S. Pat. Nos. 4,234,435 and 3,172,892. Another class of ashless dispersant is high molecular weight esters, prepared by reaction of a hydrocarbyl acylating agent and a polyhydric aliphatic alcohol such as glycerol, pentaerythritol, or sorbitol. Such materials are described in more detail in U.S. Pat. No. 3,381,022.

Nitrogen-containing detergents may be the reaction products of a carboxylic acid-derived acylating agent and an amine. The acylating agent can vary from formic acid and its acylating derivatives to acylating agents having high molecular weight aliphatic substituents of up to 5,000, 10,000 or 20,000 carbon atoms. The amino compounds can vary from ammonia itself to amines typically having aliphatic substituents of up to 30 carbon atoms, and up to 11 nitrogen atoms. Acylated amino compounds suitable for use in the present invention may be those formed by the reaction of an acylating agent having a hydrocarbyl substituent of at least 8 carbon atoms and a compound comprising at least one primary or secondary amine group. The acylating agent may be a mono- or polycarboxylic acid (or reactive equivalent thereof) for example a substituted succinic, phthalic or propionic acid and the amino compound may be a polyamine or a mixture of polyamines, for example a mixture of ethylene polyamines. Alternatively, the amine may be a hydroxyalkyl-substituted polyamine. The hydrocarbyl substituent in such acylating agents may comprise at least 10 carbon atoms. In one embodiment, the hydrocarbyl substituent may comprise at least 12, for example 30 or 50 carbon atoms. In yet another embodiment, it may comprise up to 200 carbon atoms. The hydrocarbyl substituent of the acylating agent may have a number average molecular weight ($M_n$) of 170 to 2800, for example from 250 to 1500. In other embodiments, the substituent's $M_n$ may range from 500 to 1500, or alternatively from 500 to 1100. In yet another embodiment, the substituent's $M_n$ may range from 700 to 1300. In another embodiment, the hydrocarbyl substituent may have a number average molecular weight of 700 to 1000, or 700 to 850, or, for example, 750.

Another class of ashless dispersant is Mannich bases. These are materials which are formed by the condensation of a higher molecular weight, alkyl substituted phenol, an alkylene polyamine, and an aldehyde such as formaldehyde and are described in more detail in U.S. Pat. No. 3,634,515.

A useful nitrogen containing dispersant includes the product of a Mannich reaction between (a) an aldehyde, (b) a polyamine, and (c) an optionally substituted phenol. The phenol may be substituted such that the Mannich product has a molecular weight of less than 7500. Optionally, the molecular weight may be less than 2000, less than 1500, less than 1300, or for example, less than 1200, less than 1100, less than 1000. In some embodiments, the Mannich product has a molecular weight of less than 900, less than 850, or less than 800, less than 500, or less than 400. The substituted phenol may be substituted with up to 4 groups on the aromatic ring. For example, it may be a tri or di-substituted phenol. In some embodiments, the phenol may be a mono-substituted phenol. The substitution may be at the ortho, and/or meta, and/or para position(s). To form the Mannich product, the molar ratio of the aldehyde to amine is from 4:1 to 1:1 or, from 2:1 to 1:1. The molar ratio of the aldehyde to phenol may be at least 0.75:1; preferably from 0.75 to 1 to 4:1, preferably 1:1 to 4;1 more preferably from 1:1 to 2:1. To form the preferred Mannich product, the molar ratio of the phenol to amine is preferably at least 1.5:1, more preferably at least 1.6:1, more preferably at least 1.7:1, for example at least 1.8:1, preferably at least 1.9:1. The molar ratio of phenol to amine may be up to 5:1; for example it may be up to 4:1, or up to 3.5:1. Suitably it is up to 3.25:1, up to 3:1, up to 2.5:1, up to 2.3:1 or up to 2.1:1.

Other dispersants include polymeric dispersant additives, which are generally hydrocarbon-based polymers which contain polar functionality to impart dispersancy characteristics to the polymer. An amine is typically employed in preparing the high TBN nitrogen-containing dispersant. One or more poly(alkyleneamine)s may be used, and these may comprise one or more poly(ethyleneamine)s having 3 to 5 ethylene units and 4 to 6 nitrogen units. Such materials include triethylenetetramine (TETA), tetraethylenepentamine (TEPA), and pentaethylenehexamine (PEHA). Such materials are typically commercially available as mixtures of various isomers containing a range number of ethylene units and nitrogen atoms, as well as a variety of isomeric structures, including various cyclic structures. The poly (alkyleneamine) may likewise comprise relatively higher molecular weight amines known in the industry as ethylene amine still bottoms.

In an embodiment, the fuel composition can additionally comprise quaternary ammonium salts. The quaternary ammonium salts can comprise (a) a compound comprising (i) at least one tertiary amino group as described above, and (ii) a hydrocarbyl-substituent having a number average molecular weight of 100 to 5000, or 250 to 4000, or 100 to 4000 or 100 to 2500 or 3000; and (b) a quaternizing agent suitable for converting the tertiary amino group of (a)(i) to a quaternary nitrogen, as described above. The other quaternary ammonium salts are more thoroughly described in U.S. Pat. No. 7,951,211, issued May 31, 2011, and U.S. Pat. No. 8,083,814, issued Dec. 27, 2011, and U.S. Publication Nos. 2013/0118062, published May 16, 2013, 2012/0010112, published Jan. 12, 2012, 2013/0133243, published May 30, 2013, 2008/0113890, published May 15, 2008, and 2011/0219674, published Sep. 15, 2011, US 2012/0149617 published May 14, 2012, US 2013/0225463 published Aug. 29, 2013, US 2011/0258917 published Oct. 27, 2011, US 2011/0315107 published Dec. 29, 2011, US 2013/0074794 published Mar. 28, 2013, US 2012/0255512 published Oct. 11, 2012, US 2013/0333649 published Dec. 19, 2013, US 2013/0118062 published May 16, 2013, and international publications WO Publication Nos. 2011/141731, published Nov. 17, 2011, 2011/095819, published Aug. 11, 2011, and 2013/017886, published Feb. 7, 2013, WO 2013/070503 published May 16, 2013, WO 2011/110860 published Sep. 15, 2011, WO 2013/017889 published Feb. 7, 2013, WO 2013/017884 published Feb. 7, 2013.

The quaternary ammoniums salts can be prepared from hydrocarbyl substituted acylating agents, such as, for example, polyisobutyl succinic acids or anhydrides, having a hydrocarbyl substituent with a number average molecular weight of greater than 1200 $M_n$, polyisobutyl succinic acids or anhydrides, having a hydrocarbyl substituent with a number average molecular weight of 300 to 750, or polyisobutyl succinic acids or anhydrides, having a hydrocarbyl substituent with a number average molecular weight of 1000 $M_n$.

In an embodiment, the additional salts may be an imide prepared from the reaction of a nitrogen containing compound and a hydrocarbyl substituted acylating agent having a hydrocarbyl substituent with a number average molecular weight of 1300 to 3000. In an embodiment, the quaternary ammonium salts prepared from the reaction of nitrogen containing compound and a hydrocarbyl substituted acylating agent having a hydrocarbyl substituent with a number average molecular weight of greater than 1200 $M_n$ or, having a hydrocarbyl substituent with a number average molecular weight of 300 to 750 is an amide or ester.

In an embodiment the nitrogen containing compound of the additional quaternary ammonium salts is an imidazole or nitrogen containing compound of either of formulas:

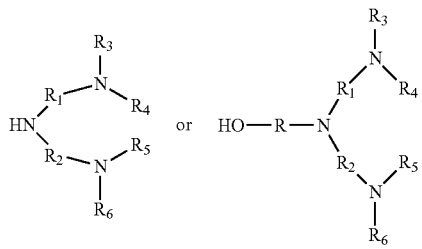

wherein R may be a $C_1$ to $C_6$ alkylene group; each of $R_1$ and $R_2$, individually, may be a $C_1$ to $C_6$ hydrocarbylene group; and each of $R_3$, $R_4$, $R_5$, and $R_6$, individually, may be a hydrogen or a $C_1$ to $C_6$ hydrocarbyl group.

In other embodiments, the quaternizing agent used to prepare the additional quaternary ammonium salts can be a dialkyl sulfate, an alkyl halide, a hydrocarbyl substituted carbonate, a hydrocarbyl epoxide, a carboxylate, alkyl esters, or mixtures thereof. In some cases, the quaternizing agent can be a hydrocarbyl epoxide. In some cases, the quaternizing agent can be a hydrocarbyl epoxide in combination with an acid. In some cases, the quaternizing agent can be a salicylate, oxalate or terephthalate. In an embodiment, the hydrocarbyl epoxide is an alcohol functionalized epoxides or $C_4$ to $C_{14}$ epoxides.

In some embodiments, the quaternizing agent is multifunctional resulting in the additional quaternary ammonium salts being a coupled quaternary ammoniums salts.

Typical treat rates of additional detergents/dispersants to a fuel of the invention is 0 to 500 ppm, or 0 to 250 ppm, or 0 to 100 ppm, or 5 to 250 ppm, or 5 to 100 ppm, or 10 to 100 ppm.

In a yet another embodiment, a fuel composition comprises further comprises a cold flow improver. The cold flow improver is typically selected from (1) copolymers of a $C_2$- to $C_{40}$-olefin with at least one further ethylenically unsaturated monomer; (2) comb polymers; (3) polyoxyalkylenes; (4) polar nitrogen compounds; and (5) poly(meth)acrylic esters made from linear alcohols having 10 to 22 carbon atoms. It is possible to use either mixtures of different representatives from one of the particular classes (1) to (5) or mixtures of representatives from different classes (1) to (5).

Suitable $C_2$- to $C_{40}$-olefin monomers for the copolymers of class (1) are, for example, those having 2 to 20 and especially 2 to 10 carbon atoms, and 1 to 3 and preferably 1 or 2 carbon-carbon double bonds, especially having one carbon-carbon double bond. In the latter case, the carbon-carbon double bond may be arranged either terminally (α-olefins) or internally. However, preference is given to α-olefins, more preferably α-olefins having 2 to 6 carbon atoms, for example propene, 1-butene, 1-pentene, 1-hexene and in particular ethylene. The at least one further ethylenically unsaturated monomer of class (1) is preferably selected from alkenyl carboxylates; for example, $C_2$- to $C_{14}$-alkenyl esters, for example the vinyl and propenyl esters, of carboxylic acids having 2 to 21 carbon atoms, whose hydrocarbon radical may be linear or branched among these, preference is given to the vinyl esters, examples of suitable alkenyl carboxylates are vinyl acetate, vinyl propionate, vinyl butyrate, vinyl 2-ethylhexanoate, vinyl neopentanoate, vinyl hexanoate, vinyl neononanoate, vinyl neodecanoate and the corresponding propenyl esters, (meth)acrylic esters; for example, esters of (meth)acrylic acid with $C_1$- to $C_{20}$-alkanols, especially $C_1$- to $C_{10}$-alkanols, in particular with methanol, ethanol, propanol, isopropanol, n-butanol, sec-butanol, isobutanol, tert-butanol, pentanol, hexanol, heptanol, octanol, 2-ethylhexanol, nonanol and decanol, and structural isomers thereof and further olefins; preferably higher in molecular weight than the abovementioned $C_2$- to $C_{40}$-olefin base monomer for example, the olefin base monomer used is ethylene or propene, suitable further olefins are in particular $C_{10}$- to $C_{40}$-α-olefins.

Suitable copolymers of class (1) are also those which comprise two or more different alkenyl carboxylates in copolymerized form, which differ in the alkenyl function and/or in the carboxylic acid group. Likewise, suitable are copolymers which, as well as the alkenyl carboxylate(s), comprise at least one olefin and/or at least one (meth)acrylic ester in copolymerized form.

Terpolymers of a $C_2$- to $C_{40}$-α-olefin, a $C_1$- to $C_{20}$-alkyl ester of an ethylenically unsaturated monocarboxylic acid having 3 to 15 carbon atoms and a $C_2$- to $C_{14}$-alkenyl ester of a saturated monocarboxylic acid having 2 to 21 carbon atoms are also suitable as copolymers of class (K1). Terpolymers of this kind are described in WO 2005/054314. A typical terpolymer of this kind is formed from ethylene, 2-ethylhexyl acrylate and vinyl acetate.

The at least one or the further ethylenically unsaturated monomer(s) are copolymerized in the copolymers of class (1) in an amount of preferably 1 to 50% by weight, especially 10 to 45% by weight and in particular 20 to 40% by weight, based on the overall copolymer. The main proportion in terms of weight of the monomer units in the copolymers of class (1) therefore originates generally from the $C_2$ to $C_{40}$ base olefins. The copolymers of class (1) may have a number average molecular weight $M_n$ of 1000 to 20,000, or 1000 to 10,000 or 1000 to 8000.

Typical comb polymers of component (2) are, for example, obtainable by the copolymerization of maleic anhydride or fumaric acid with another ethylenically unsaturated monomer, for example with an α-olefin or an unsaturated ester, such as vinyl acetate, and subsequent esterification of the anhydride or acid function with an alcohol having at least 10 carbon atoms. Further suitable comb polymers are copolymers of α-olefins and esterified comonomers, for example esterified copolymers of styrene and maleic anhydride or esterified copolymers of styrene and fumaric acid. Suitable comb polymers may also be polyfumarates or polymaleates. Homo- and copolymers of vinyl ethers are also suitable comb polymers. Comb polymers suitable as components of class (2) are, for example, also those described in WO 2004/035715 and in "Comb-Like Polymers. Structure and Properties", N. A. Plate and V. P. Shibaev, J. Poly. Sci. Macromolecular Revs. 8, pages 117 to 253 (1974). Mixtures of comb polymers are also suitable.

Polyoxyalkylenes suitable as components of class (3) are, for example, polyoxyalkylene esters, polyoxyalkylene ethers, mixed polyoxyalkylene ester/ethers and mixtures thereof. These polyoxyalkylene compounds preferably comprise at least one linear alkyl group, preferably at least two linear alkyl groups, each having 10 to 30 carbon atoms and a polyoxyalkylene group having a number average molecular weight of up to 5000. Such polyoxyalkylene compounds are described, for example, in EP-A 061 895 and also in U.S. Pat. No. 4,491,455. Particular polyoxyalkylene compounds are based on polyethylene glycols and polypropylene glycols having a number average molecular weight of 100 to 5000. Additionally, suitable are polyoxyalkylene mono- and diesters of fatty acids having 10 to 30 carbon atoms, such as stearic acid or behenic acid.

Polar nitrogen compounds suitable as components of class (4) may be either ionic or nonionic and may have at least one substituent, or at least two substituents, in the form of a tertiary nitrogen atom of the general formula >$NR^7$ in which $R^7$ is a $C_8$- to $C_{40}$-hydrocarbon radical. The nitrogen substituents may also be quaternized i.e. be in cationic form. An example of such nitrogen compounds is that of ammonium salts and/or amides which are obtainable by the reaction of at least one amine substituted by at least one hydrocarbon radical with a carboxylic acid having 1 to 4 carboxyl groups or with a suitable derivative thereof. The amines may comprise at least one linear $C_8$- to $C_{40}$-alkyl radical. Primary amines suitable for preparing the polar nitrogen compounds mentioned are, for example, octylamine, nonylamine, decylamine, undecylamine, dodecylamine, tetradecylamine and the higher linear homologs. Secondary amines suitable for this purpose are, for example, dioctadecylamine and methylbehenylamine. Also suitable for this purpose are amine mixtures, in particular amine mixtures obtainable on the industrial scale, such as fatty amines or hydrogenated tallow amines, as described, for example, in Ullmann's Encyclopedia of Industrial Chemistry, 6th Edition, "Amines, aliphatic" chapter. Acids suitable for the reaction are, for example, cyclohexane-1,2-dicarboxylic acid, cyclohexene-1,2-dicarboxylic acid, cyclopentane-1,2-dicarboxylic acid, naphthalene dicarboxylic acid, phthalic acid, isophthalic acid, terephthalic acid, and succinic acids substituted by long-chain hydrocarbon radicals.

Poly(meth)acrylic esters suitable as cold flow improvers of class (5) are either homo- or copolymers of acrylic and methacrylic esters. Preference is given to copolymers of at least two different (meth)acrylic esters which differ with regard to the esterified alcohol. The copolymer optionally comprises another different olefinically unsaturated monomer in copolymerized form. The weight-average molecular weight of the polymer is preferably 50,000 to 500,000. The polymer may be a copolymer of methacrylic acid and methacrylic esters of saturated $C_{14}$ and $C_{15}$ alcohols, the acid groups having been neutralized with hydrogenated tallow amine. Suitable poly(meth)acrylic esters are described, for example, in WO 00/44857.

The cold flow improver or the mixture of different cold flow improvers is added to the middle distillate fuel or diesel fuel in a total amount of preferably 0 to 5000 ppm by weight, or 10 to 5000 ppm by weight, or 20 to 2000 ppm by weight, or 50 to 1000 ppm by weight, or 100 to 700 ppm by weight, for example of 200 to 500 ppm by weight.

Additional antifoams and/or foam inhibitors may be used in addition to the poly(acrylate) polymer antifoam components disclosed herein. These additional foam inhibitors include polysiloxanes, copolymers of ethyl acrylate and 2-ethylhexylacrylate and optionally vinyl acetate; demulsifiers including fluorinated polysiloxanes, trialkyl phosphates, polyethylene glycols, polyethylene oxides, polypropylene oxides and (ethylene oxide-propylene oxide) polymers. The disclosed technology may also be used with a silicone-containing antifoam agent in combination with a $C_5$-$C_{17}$ alcohol. In yet other embodiments, the additional antifoams may include organic silicones such as polydimethyl siloxane, polyethylsiloxane, polydiethylsiloxane, polyacrylates and polymethacrylates, trimethyl-triflouro-propylmethyl siloxane and the like.

The compositions disclosed herein may also comprise lubricity improvers or friction modifiers typically based on fatty acids or fatty acid esters. Typical examples are tall oil fatty acid, as described, for example, in WO 98/004656, and glyceryl monooleate. The reaction products, described in U.S. Pat. No. 6,743,266 B2, of natural or synthetic oils, for example triglycerides, and alkanolamines are also suitable as such lubricity improvers. Additional examples include commercial tall oil fatty acids containing polycyclic hydrocarbons and/or rosin acids.

The compositions disclosed herein may also comprise additives to reduce the amount of metal solubilized in the fuel (reduces "metal pick-up"). These additives may be a hydrocarbon substituted with at least two carboxy functionalities in the form of acids or at least one carboxy functionality in the form an anhydride. Suitable metal pick-up additives include di-acid polymers derived from fatty acids and/or polyolefins, including polyalkenes. Exemplary polyolefins include $C_{10}$ to $C_{20}$ polyolefins, $C_{12}$ to $C_{18}$ polyolefins, and/or $C_{16}$ to $C_{18}$ polyolefins. The polyalkene may be characterized by a (number average molecular weight) of at least about 300. In some embodiments, the metal-pick-up additive comprises more hydrocarbyl substituted succinic anhydride groups. In some embodiments the hydrocarbyl substituted acylating agent comprises one or more hydrolyzed hydrocarbyl substituted succinic anhydride groups (i.e., hydrocarbyl substituted succinic acid). In some embodiments the hydrocarbyl substituents are derived from homopolymers and/or copolymers containing 2 to 10 carbon atoms. In some embodiments the hydrocarbyl substituents above are derived from polyisobutylene. In one embodiment, the metal pick-up additive comprises hydrolyzed polyisobutylene succinic anhydride (PIBSA) or polyisobutylene succinic acid.acid.acid.

The fuel compositions disclosed herein may also comprise one or more antistatic agents, also commonly referred to as static dissipators or conductivity improvers. Suitable antistatic agents include but are not limited to alkyl benzene sulfonic acid.

Additive Packages

Fuel additive packages and their uses are also disclosed herein. The fuel additive packages may comprise one or more of the fuel additives described above. In one embodiment, the fuel additive package may comprise: (i) at least one quaternary ammonium salt; (ii) at least one hydrolyzed polyisobutylene succinic anhydride (PIBSA), polyisobutylene succinic acid, or combinations thereof; (iii) at least one demulsifier; (iv) at least one antifoam component as described above; (v) optionally, at least one cetane improver; and (vi) optionally, at least one solvent. Suitable solvents include paraffinic solvents, aromatic solvents, aliphatic solvents, protic solvents, or combinations thereof. In one embodiment, the at least one solvent may comprise an aromatic solvent (such as heavy aromatic naphtha), ethyl hexyl alcohol, or combinations thereof. The poly(acrylate) polymer antifoam components disclosed herein may be provided with one or more additives described above in an additive package composition. The additive package composition may comprise one or more additives in a concentrated solution suitable for adding to a diesel fuel. Exemplary additive package compositions are included in Table 1. The amounts shown are in weight percents, based on a total weight of the additive package.

TABLE 1

| Additive Package | A | B | C | D | E | F | G |
|---|---|---|---|---|---|---|---|
| Quaternary ammonium salts | 5 to 20 | 5 to 20 | 15 to 35 | 15 to 35 | 10 to 20 | 10 to 30 | 10 to 40 |
| Hydrolyzed PIBSA | 1 to 10 | 1 to 10 | 5 to 15 | 5 to 15 | 1 to 5 | 3 to 12 | 5 to 15 |
| Demulsifier | 0.2 to 3 | 0.2 to 3 | 1 to 6 | 0.2 to 3 | 0.1 to 1 | 1 to 5 | 2 to 4 |
| Antifoam component | 1 to 5 | 1 to 10 | 3 to 10 | 2.5 to 7.5 | 0.5 to 5 | 1 to 10 | 7 to 15 |
| Cetane improver | 0 | 60-90 | 0 | 0 | 0 | 0 | 0 |
| Aromatic solvent | 40 to 60 | 0 | 0 to 30 | 35 to 60 | 40 to 80 | 30 to 60 | 30 to 70 |
| Ethyl hexyl alcohol | 15 to 30 | 0 | 40 to 80 | 15 to 30 | 10 to 40 | 10 to 35 | 5 to 30 |

INDUSTRIAL APPLICATION

In one embodiment, the invention is useful in a liquid fuel in an internal combustion engine. The internal combustion engine may be a diesel engine. Exemplary internal combustion engines include, but are not limited to, compression ignition engines; 4-stroke cycles; liquid fuel supplied via direct injection, indirect injection, common rail and unit injector systems; light (e.g. passenger car) and heavy duty (e.g. commercial truck) engines; and engines fueled with hydrocarbon and non-hydrocarbon fuels and mixtures thereof. The engines may be part of integrated emissions systems incorporating such elements as; EGR systems; aftertreatment including three-way catalyst, oxidation catalyst, $NO_x$ absorbers and catalysts, catalyzed and non-catalyzed particulate traps optionally employing fuel-borne catalyst; variable valve timing; and injection timing and rate shaping.

In one embodiment, the technology may be used with diesel engines having direct fuel injection systems wherein the fuel is injected directly into the engine's combustion chamber. The ignition pressures may be greater than 1000 bar and, in one embodiment, the ignition pressure may be greater than 1350 bar. Accordingly, in another embodiment, the direct fuel injection system may be a high-pressure direct fuel injection system having ignition pressures greater than 1350 bar. Exemplary types of high-pressure direct fuel injection systems include, but are not limited to, unit direct injection (or "pump and nozzle") systems, and common rail systems. In unit direct injection systems, the high-pressure fuel pump, fuel metering system and fuel injector are combined into one apparatus. Common rail systems have a series of injectors connected to the same pressure accumulator, or rail. The rail in turn, is connected to a high-pressure fuel pump. In yet another embodiment, the unit direct injection or common rail systems may further comprise an optional turbocharged or supercharged direct injection system.

Methods reducing the amount of foam produced while filing the fuel tank of a vehicle are also disclosed. The method may comprise adding a poly(acrylate) polymer made from a (meth)acrylate monomer to a fuel. The poly(acrylate) polymer may be as described above. Methods of reducing foam in a fuel comprising adding the fuel additive package described above to a fuel are also disclosed.

It is known that some of the materials described above may interact in the final formulation, so that the components of the final formulation may be different from those that are initially added. For instance, metal ions (of, e.g., a detergent) can migrate to other acidic or anionic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

The following examples provide illustrations of the disclosed technology. These examples are non-exhaustive and are not intended to limit the scope of the disclosed technology.

EXAMPLES

Preparation of Inventive Composition 1 (TBAT:TMHAT, 95:05 by Wt)—In toluene Process:

Inventive Composition 1 is prepared by thoroughly mixing tert-butyl acrylate (TBAT) (190.0 g), 3,5,5-trimethylhexyl acrylate (TMHAT) (10.0 g), and tert-butyl peroxy-2-ethylhexanoate (TBPE) (0.22 g) in a glass bottle to prepare a monomer mixture. Then, 66.67 g of the monomer mixture along with 100.0 g of toluene are transferred to a 1 L round bottom flask equipped with a mechanical stirrer, Claisen adapter with water-cooled condenser and nitrogen inlet (set at 0.2 standard cubic feet per hours (scfh)), a thermocouple and stopper ("reaction vessel"). This mixture is heated to 90° C. The remaining 133.3 g of the monomer mixture is added over 180 minutes via peristaltic pump and maintained at 90° C. for the duration of the addition. After all the monomer mixture is transferred to the reaction vessel, the reaction temperature is maintained at 90° C. for 180 min. Then the temperature is adjusted to 100° C., and TBPE (0.06 g) is added to the reaction vessel and held for 60 min. Similarly, three more TBPE (0.06 g) aliquots are charged and allowed to react for 60 min after each addition. Once complete monomer consumption is observed, 100.0 g toluene is added and stirred for 30 min. The reaction vessel contents are cooled and a colorless liquid having a $M_w$ of 146,746 Da is obtained. A portion of the colorless liquid (50 g) is transferred to a 25 ml single neck round-bottom flask and the toluene is removed via rotavapor. The purified bottoms comprise the poly(acrylate) polymer.

Preparation of Inventive Composition 2 (TBAT:TMHAT, 90:10 by Wt)—In toluene Process:

Inventive Composition 2 is prepared by thoroughly mixing tert-butyl acrylate (TBAT) (180.0 g), 3,5,5-trimethylhexyl acrylate (TMHAT) (20.0 g), and tert-butyl peroxy-2-ethylhexanoate (TBPE) (0.22 g) in a glass bottle to prepare a monomer mixture. Then, 66.67 g of the monomer mixture along with 100.0 g of toluene are transferred to a 1 L round bottom flask equipped with a mechanical stirrer, Claisen adapter with water-cooled condenser and nitrogen inlet (set at 0.2 standard cubic feet per hours (scfh)), a thermocouple and stopper ("reaction vessel"). This mixture is heated to 90° C. The remaining 133.3 g of the monomer mixture is added over 180 minutes via peristaltic pump and maintained at 90° C. for the duration of the addition. After all the monomer mixture is transferred to the reaction vessel, the reaction temperature is maintained at 90° C. for 180 min. Then the temperature is adjusted to 100° C., and TBPE (0.06 g) is added to the reaction vessel and held for 60 min. Similarly, three more TBPE (0.06 g) aliquots are charged and allowed to react for 60 min after each addition. Once complete monomer consumption is observed, 100.0 g toluene is added and stirred for 30 min. The reaction vessel contents are cooled and a colorless liquid having a $M_w$ of 155,702 Da is obtained. A portion of the colorless liquid (50 g) is transferred to a 25 ml single neck round-bottom flask and the toluene is removed via rotavapor. The purified bottoms comprise the poly(acrylate) polymer.

Preparation of Inventive Composition 3 (TBAT:TMHAT:EAT, 75:20:05 by Wt)—In Toluene Process: (Prophetic Example)

Inventive Composition 3 is prepared by thoroughly mixing tert-butyl acrylate (TBAT) (150.0 g), 3,5,5-trimethylhexyl acrylate (TMHAT) (40.0 g), ethyl acrylate (EAT) (10.0 g) and tert-butyl peroxy-2-ethylhexanoate (TBPE) (0.22 g) in a glass bottle. Then, 66.67 g of the monomer mixture along with 100.0 g of toluene are transferred to a 1 L round bottom flask equipped with a mechanical stirrer, Claisen adapter with water-cooled condenser and nitrogen inlet (set at 0.2 standard cubic feet per hours (scfh)), a thermocouple and stopper ("reaction vessel"). This mixture is heated to 90° C. The remaining 133.3 g of the monomer mixture is added over 180 minutes via peristaltic pump and maintained at 90° C. for the duration of the addition. After all the monomer mixture is transferred to the reaction vessel, the reaction temperature is maintained at 90° C. for 180 min. Then the temperature is adjusted to 100° C., and TBPE (0.06 g) is added to the reaction vessel and held for 60 min. Similarly, three more TBPE (0.06 g) aliquots are charged and allowed to react for 60 min after each addition. Once complete monomer consumption is observed, 100.0 g toluene is added and stirred for 30 min. The reaction vessel contents are cooled and have a calculated $M_w$ of 95,000 Da. A portion of the colorless liquid (50 g) is transferred to a 25 ml single neck round-bottom flask and the toluene is removed via rotavapor. The purified bottoms comprise the poly(acrylate) polymer.

Preparation of Inventive Composition 3a (TBAT:TMHAT:EAT, 85:11:04 by Wt)—In toluene process:

Inventive Composition 3a is prepared by reacting Tert-Butyl acrylate (TBAT), 3,5,5-trimethylhexyl acrylate (TMHAT), ethyl acrylate (EAT) and tert-butyl peroxy-2-ethylhexanoate (TBPE) in toluene. TBAT, (170.0 g), TMHAT (22.0 g), EAT (8.0 g) and tert-butyl peroxy-2-ethylhexanoate (TBPE) (0.22 g) are thoroughly mixed in a glass bottle. A 1 L round bottom flask equipped with a mechanical stirrer, Claisen adapter with water-cooled condenser and nitrogen inlet set at 0.2 standard cubic feet per hours (scfh), thermocouple and stopper are charged with 66.67 g of the above reaction mixture along with a 100.0 g of toluene. This mixture is heated to 90° C. The remaining 133.3 g of the reaction mixtures is added over 180 minutes via peristaltic pump and maintained at 90° C. for the duration of the addition. After complete, the monomer addition reaction temperature is maintained at 90° C. for 180 min. Then the temperature is adjusted to 100° C., and TBPE (0.06 g) is added to the reaction vessel and held for 60 min. Similarly, three more TBPE (0.06 g) aliquots are charged and allowed to react 60 min at each addition. Once complete monomer consumption is observed, 100.0 g toluene is added and started for 30 min, then the reaction contents are cooled and having a $M_w$ of 168063 Da. A 50 g of toluene diluted mixture is transferred to a 25 ml single neck round-bottom flask. Toluene is removed via rotavapor, attained a viscous colorless liquid and use for foam testing.

Preparation of Inventive Composition 4 (TBAT:TMHAT: PEGA, 78:20:02 by Wt)—In Toluene Process: (Prophetic Example)

Inventive Composition 4 is prepared by thoroughly mixing tert-butyl acrylate (TBAT) (156.0 g), 3,5,5-trimethylhexyl acrylate (TMHAT) (40.0 g), poly(ethylene glycol) acrylate (PEGAT) (4.0 g), and tert-butyl peroxy-2-ethylhexanoate (TBPE) (0.22 g) in a glass bottle. Then, 66.67 g of the monomer mixture along with 100.0 g of toluene are transferred to a 1 L round bottom flask equipped with a mechanical stirrer, Claisen adapter with water-cooled condenser and nitrogen inlet (set at 0.2 standard cubic feet per hours (scfh)), a thermocouple and stopper ("reaction vessel"). This mixture is heated to 90° C. The remaining 133.3 g of the monomer mixture is added over 180 minutes via peristaltic pump and maintained at 90° C. for the duration of the addition. After all the monomer mixture is transferred to the reaction vessel, the reaction temperature is maintained at 90° C. for 180 min. Then the temperature is adjusted to 100° C., and TBPE (0.06 g) is added to the reaction vessel and held for 60 min. Similarly, three more TBPE (0.06 g) aliquots are charged and allowed to react for 60 min after each addition. Once complete monomer consumption is observed, 100.0 g toluene is added and stirred for 30 min. The reaction vessel contents are cooled and have a calculated $M_w$ of 150,000 Da. A portion of the colorless liquid (50 g) is transferred to a 25 ml single neck round-bottom flask and the toluene is removed via rotavapor. The purified bottoms comprise the poly(acrylate) polymer.

Preparation of Inventive Composition 5 (TBAT:TMHAT, 95:05 by Wt)—In Oil Process: (Prophetic Example)

Inventive Composition 5 is prepared by prepared by thoroughly mixing tert-butyl acrylate (TBAT) (190.0 g), 3,5,5-trimethylhexyl acrylate (TMHAT) (10.0 g), and tert-butyl peroxy-2-ethylhexanoate (TBPE) (0.22 g) in a glass bottle. Then, 66.67 g of the monomer mixture along with 100.0 g of mineral oil (SFNF) having a kinematic viscosity at 100° C. of ~3.7 cSt. are transferred to a 1 L round bottom flask equipped with a mechanical stirrer, Claisen adapter with water-cooled condenser and nitrogen inlet (set at 0.2 standard cubic feet per hours (scfh)), a thermocouple and stopper ("reaction vessel"). This mixture is heated to 90° C. The remaining 133.3 g of the monomer mixture is added over 180 minutes via peristaltic pump and maintained at 90° C. for the duration of the addition. After all the monomer mixture is transferred to the reaction vessel, the reaction temperature is maintained at 90° C. for 180 min. Then the temperature is adjusted to 100° C., and a first finishing dose of TBPE (0.06 g) is added and the reaction is stirred for an additional 60 min. A second finishing dose of TBPE (0.06 g) is added and the reaction stirred for an additional 60 min at 100° C. A third and fourth dose of TBPE (0.06 g each) is added followed by stirring for 60 min at 100° C. after each dose. Gas chromatography is used to monitor monomer conversion to a target monomer level of less than 1% for tert-butyl acrylate and less than 0.1% for 3,5,5-trimethylhexyl acrylate. After the desired monomer conversion is achieved, an additional 100.0 g of SFNF is added to the reaction vessel and the reaction mixture allowed to stir for 30 minutes at 100° C. The reaction vessel contents are cooled. The resulting contents comprise a poly(acrylate) polymer having a calculated $M_w$ of 150,000 Da in SFNF (approximately 50% actives).

Preparation of Inventive Composition 6 (TBAT:EHAT, 95:05 by Wt)—In Toluene Process:

Inventive composition 6 is prepared by reacting tert-Butyl acrylate (TBAT), 2-ethylhexyl acrylate (EHAT) and tert-butyl peroxy-2-ethylhexanoate (TBPE) in toluene. TBAT, (190.0 g), EHAT (10.0 g) and tert-butyl peroxy-2-ethylhexanoate (TBPE) (0.22 g) are thoroughly mixed in a glass bottle. A 1 L round bottom flask equipped with a mechanical stirrer, Claisen adapter with water-cooled condenser and nitrogen inlet set at 0.2 standard cubic feet per hours (scfh), thermocouple and stopper are charged with 66.67 g of the above reaction mixture along with a 100.0 g of toluene. This mixture is heated to 90° C. The remaining 133.3 g of the reaction mixtures is added over 180 minutes via peristaltic pump and maintained at 90° C. for the duration of the addition. After the monomer addition is complete, the reaction temperature is maintained at 90° C. for 180 min. Then the temperature is adjusted to 100° C., and TBPE (0.06 g) is added to the reaction vessel and held for 60 min. Similarly, three more TBPE (0.06 g) aliquots are charged and allowed to react 60 min at each addition. Once complete monomer consumption is observed, 100.0 g toluene is added and stirred for 30 min. The reaction contents are cooled to obtain a solution containing a (poly)acrylate polymer having a $M_w$ of 165932 Da.

Preparation of Inventive Composition 7 (TBAT:EHAT, 90:10 by Wt)—In Toluene Process:

Inventive composition 7 is prepared by reacting Tert-Butyl acrylate (TBAT), 2-ethylhexyl acrylate (EHAT) and tert-butyl peroxy-2-ethylhexanoate (TBPE) in toluene. TBAT, (180.0 g), TMHAT (20.0 g) and tert-butyl peroxy-2-ethylhexanoate (TBPE) (0.22 g) are thoroughly mixed in a glass bottle. A 1 L round bottom flask equipped with a mechanical stirrer, Claisen adapter with water-cooled condenser and nitrogen inlet set at 0.2 standard cubic feet per hours (scfh), thermocouple and stopper is charged with 66.67 g of the above reaction mixture along with a 100.0 g of toluene. This mixture is heated to 90° C. The remaining 133.3 g of the reaction mixtures is added over 180 minutes via peristaltic pump and maintained at 90° C. for the duration of the addition. After the monomer addition is complete, the reaction temperature is maintained at 90° C. for 180 min. Then the temperature is adjusted to 100° C., and TBPE (0.06 g) is added to the reaction vessel and held for 60 min. Similarly, three more TBPE (0.06 g) aliquots are charged and allowed to react 60 min at each addition. Once complete monomer consumption is observed, 100.0 g toluene is added and started for 30 min, then the reaction contents are cooled and obtained a colorless liquid, and having a $M_w$ of 161957 Da.

Preparation of Inventive Composition 8 (TBAT:EHAT, 90:10 by Wt)—In heavy Aromatic Naphtha Process:

Inventive composition 8 is prepared by reacting Tert-Butyl acrylate (TBAT), 2-ethylhexyl acrylate (EHAT) and tert-butyl peroxy-2-ethylhexanoate (TBPE) in heavy aromatic naphtha. TBAT, (180.0 g), EHAT (20.0 g) and tert-butyl peroxy-2-ethylhexanoate (TBPE) (0.22 g) are thoroughly mixed in a glass bottle. A 1 L round bottom flask (equipped with a mechanical stirrer, Claisen adapter with water-cooled condenser and nitrogen inlet set at 0.2 standard cubic feet per hours (scfh), thermocouple and stopper) is charged with 66.67 g of the above reaction mixture along with a 100.0 g of heavy aromatic naphtha. This mixture is heated to 90° C. The remaining 133.33 g of the reaction mixtures and 60.0 g of heavy aromatic naphtha are added over 180 minutes via peristaltic pump and maintained at 90° C. for the duration of the addition. After the addition is complete, the reaction temperature is maintained at 90° C. for 180 minutes ("min"). The temperature is then adjusted to 100° C., and TBPE (0.06 g) is added to the reaction vessel and held for 60 min. Similarly, three more TBPE (0.06 g) aliquots are charged and allowed to react 60 min at each addition. Once complete monomer consumption is observed, 40.0 g heavy aromatic naphtha is added and started for 30 min. The reaction contents are cooled to give a solution containing a (poly)acrylate polymer with $M_w$ of 44570 Da.

Preparation of Inventive Composition 9 (TBAT:EHAT, 85:15 by Wt)—In Heavy Aromatic Naphtha Process:

Inventive composition 9 is prepared by reacting Tert-Butyl acrylate (TBAT), 2-ethylhexyl acrylate (EHAT) and tert-butyl peroxy-2-ethylhexanoate (TBPE) in heavy aromatic naphtha. TBAT, (170.0 g), EHAT (30.0 g) and tert-butyl peroxy-2-ethylhexanoate (TBPE) (0.22 g) are thoroughly mixed in a glass bottle. A 1 L round bottom flask (equipped with a mechanical stirrer, Claisen adapter with water-cooled condenser and nitrogen inlet set at 0.2 standard cubic feet per hours (scfh), thermocouple and stopper) is charged with 66.67 g of the above reaction mixture along with a 100.0 g of heavy aromatic naphtha. This mixture is heated to 90° C. The remaining 133.3 g of the reaction mixtures and 60 g of heavy aromatic naphtha are added over 180 minutes via peristaltic pump and maintained at 90° C. for the duration of the addition. After the addition is complete, the reaction temperature is maintained at 90° C. for 180 minutes ("min"). Then the temperature is adjusted to 100° C., and TBPE (0.06 g) is added to the reaction vessel and held for 60 min. Similarly, five more TBPE (0.06 g) aliquots are charged and allowed to react 60 min at each addition. Once complete monomer consumption is observed, 40.0 g heavy aromatic naphtha is added and started for 30 min. The reaction contents are cooled to give a solution containing a (poly)acrylate polymer with $M_w$ of 34670 Da.

Preparation of Inventive Composition 10 (TBMAC:EHMAC, 90:10 by Wt)—In Heavy Aromatic Naphtha Process:

Inventive composition 10 is prepared by reacting Tert-Butyl methacrylate (TBMAC), 2-ethylhexyl methacrylate (EHMAC) and tert-butyl peroxy-2-ethylhexanoate (TBPE) in heavy aromatic naphtha. TBMAC, (180.0 g), EHMAC (20.0 g) and tert-butyl peroxy-2-ethylhexanoate (TBPE) (0.22 g) are thoroughly mixed in a glass bottle. A 1 L round bottom flask (equipped with a mechanical stirrer, Claisen adapter with water-cooled condenser and nitrogen inlet set at 0.2 standard cubic feet per hours (scfh), thermocouple and stopper) is charged with 66.67 g of the above reaction mixture along with a 100.0 g of heavy aromatic naphtha. This mixture is heated to 90° C. The remaining 133.3 g of the reaction mixtures and 60 g of heavy aromatic naphtha are added over 180 minutes via peristaltic pump and maintained at 90° C. for the duration of the addition. After the addition is complete, the reaction temperature is maintained at 90° C. for 180 minutes ("min"). Then the temperature is adjusted to 100° C., and TBPE (0.06 g) is added to the reaction vessel and held for 60 min. Similarly, three more TBPE (0.06 g) aliquots are charged and allowed to react 60 min at each addition. Once complete monomer consumption is observed, 40.0 g heavy aromatic naphtha is added and started for 30 min. The reaction contents are cooled to give a solution containing a (poly)methacrylate polymer with $M_w$ of 128573 Da.

The effectiveness of the poly(acrylate) polymers disclosed herein at reducing foam in diesel fuels is tested by observing the amount of foam generated and the time it takes for the foam to collapse.

For the test, 100 ml of the additized diesel is transferred to a graduated cylinder using a pressurized injector nozzle placed 245 mm above the graduated cylinder. As the additized diesel is transferred to the cylinder, the volume of foam generated is monitored and immediately after the transfer is complete, the maximum volume of the foam is recorded in milliliters ("Max Height"). The foam volume immediately after the transfer is complete is also recorded in milliliters ("Max Foam"). The surface of the additized diesel is then visually monitored. A stop watch is used to measure the time it takes the foam to visually disappear from the surface of the additized diesel and the time is recorded in seconds ("Collapse Time").

The test is repeated 5 times and the average Max Foam, Settle Foam, and Collapse Time is calculated. The average foam test results of various poly(acrylate) polymers at different treat rates in a diesel fuel are shown in Table 2 below.

TABLE 2

| Example | Monomer Units | Weight Ratio | Polymer Mw (Da) | Treat Rate ppm (actives basis) | Max Height (ml) | Max Foam (ml) | Collapse Time (s) |
|---|---|---|---|---|---|---|---|
| Control | | | | N/A | 106 | 96 | 32 |
| Comp 1 Si antifoam | | | | 5 | 102 | 92 | 13.8 |
| Ex A | TBAT | 100 | 76,699 | 400 | 104 | 94 | 18.4 |
| Ex B | TBAT | 100 | 151,611 | 100 | 101 | 90 | 15.2 |
| Ex C | TBAT | 100 | 151,611 | 10 | 103 | 87 | 13.3 |
| Ex D | TMHAT:EAT | 85:15 | 181,419 | 800 | 60 | 10 | 13.8 |
| Ex E | TBAT | 100 | 76,699 | 400 | 76 | 34 | 12.2 |
| | TMHAT:EAT | 85:15 | 181,419 | 800 | | | |
| Ex F | TBAT:TMHAT | 95:05 | 146,746 | 100 | 99 | 89 | 8.8 |
| Ex G | TBAT:TMHAT | 95:05 | 146,746 | 10 | 102 | 92 | 8.5 |

TABLE 2-continued

| Example | Monomer Units | Weight Ratio | Polymer Mw (Da) | Treat Rate ppm (actives basis) | Max Height (ml) | Max Foam (ml) | Collapse Time (s) |
| --- | --- | --- | --- | --- | --- | --- | --- |
| Ex H | TBAT:TMHAT | 90:10 | 155,702 | 100 | 92 | 89 | 6.4 |
| Ex I | TBAT:TMHAT | 90:10 | 155,702 | 10 | 99 | 90 | 8.1 |
| Ex J | TBAT:TMHAT:EAT* | 85:11:04 | 168,063 | 2.5 | 100 | 90 | 13.0 |
| Ex K | TBAT:TMHAT:EAT* | 85:11:04 | 168,063 | 5 | 99 | 88 | 11.1 |
| Ex L | TBAT:TMHAT:EAT* | 85:11:04 | 168,063 | 10 | 99 | 89 | 10.2 |
| Ex M | TBAT:TMHAT:EAT* | 85:11:04 | 168,063 | 50 | 98 | 88 | 9.2 |
| Ex N | TBAT:TMHAT:EAT* | 85:11:04 | 168,063 | 100 | 98 | 88 | 8.6 |
| Ex O | TBAT:EHAT | 95:05 | 165,932 | 2.5 | 106 | 91 | 17.9 |
| Ex P | TBAT:EHAT | 95:05 | 165,932 | 5 | 105 | 94 | 13.7 |
| Ex Q | TBAT:EHAT | 95:05 | 165,932 | 10 | 104 | 94 | 12.8 |
| Ex R | TBAT:EHAT | 95:05 | 165,932 | 50 | 104 | 93 | 11.7 |
| Ex S | TBAT:EHAT | 95:05 | 165,932 | 100 | 102 | 92 | 10.5 |
| Ex T | TBAT:EHAT | 90:10 | 161,957 | 2.5 | 97 | 86 | 11.3 |
| Ex U | TBAT:EHAT | 90:10 | 161,957 | 5 | 97 | 87 | 11.0 |
| Ex V | TBAT:EHAT | 90:10 | 161,957 | 10 | 97 | 87 | 9.9 |
| Ex W | TBAT:EHAT | 90:10 | 161,957 | 50 | 98 | 88 | 8.8 |
| Ex X | TBAT:EHAT | 90:10 | 161,957 | 100 | 98 | 88 | 8.4 |
| Ex Y | TBAT:EHAT | 90:10 | 39,392 | 5 | 102 | 87 | 9.8 |

*A terpolymer made from three different acrylates, not a blend of polymers.

The results show that the poly(acrylate) polymers are effective antifoams and have at least the same, or even improved performance when compared to known silicon-containing antifoams.

Figure 2:
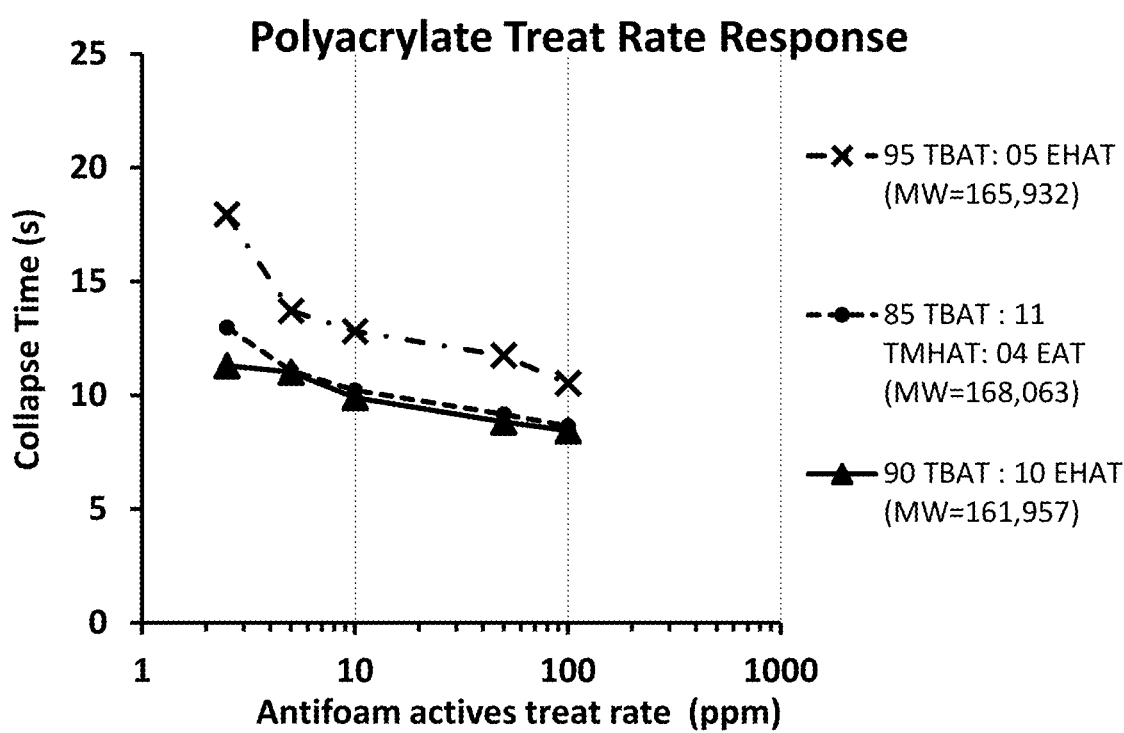
FIG. 2 is a graph showing the foam collapse time at different treat rates of various antifoam components.

FIG. 2 is a graph showing the foam collapse time at different treat rates of various antifoam components.

Figure 3:
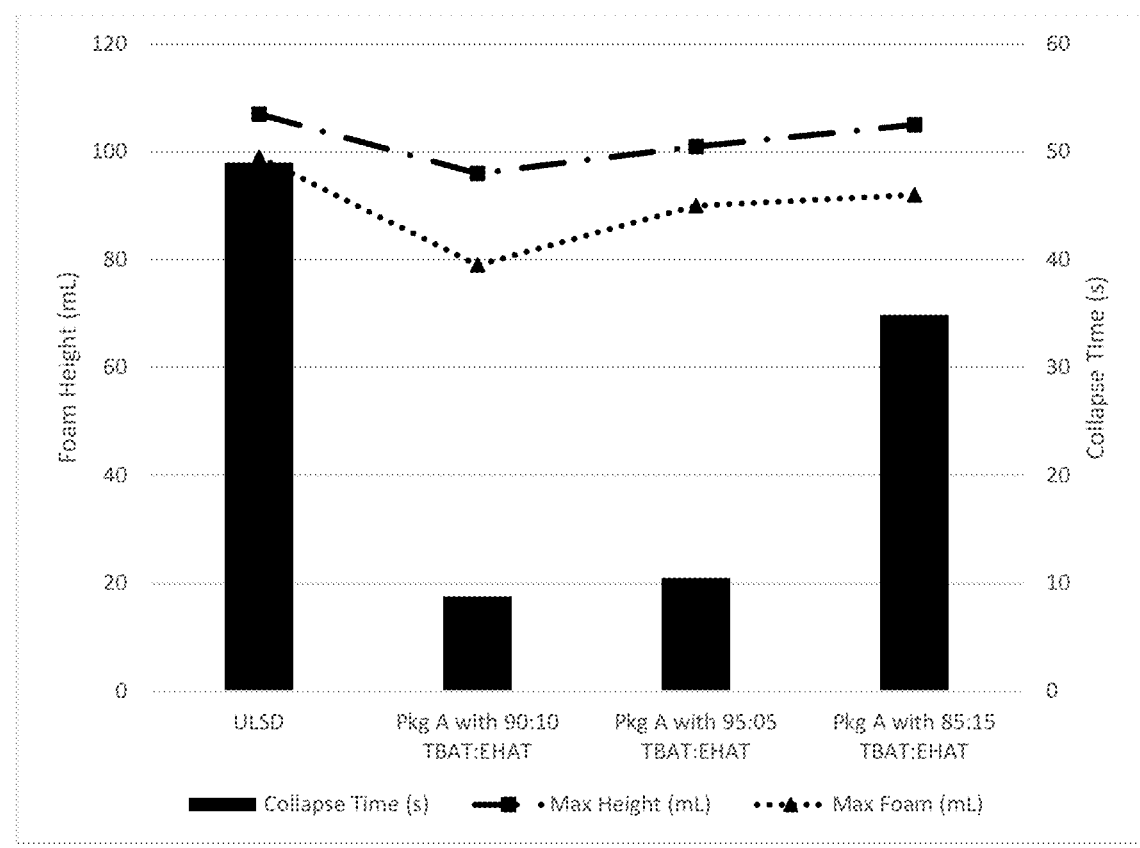
FIG. 3 is a graph showing the foam collapse time, Max Height, and Max Foam of Additive Package A with a TBAT:EHAT antifoam at different ratios.
Figure 4:
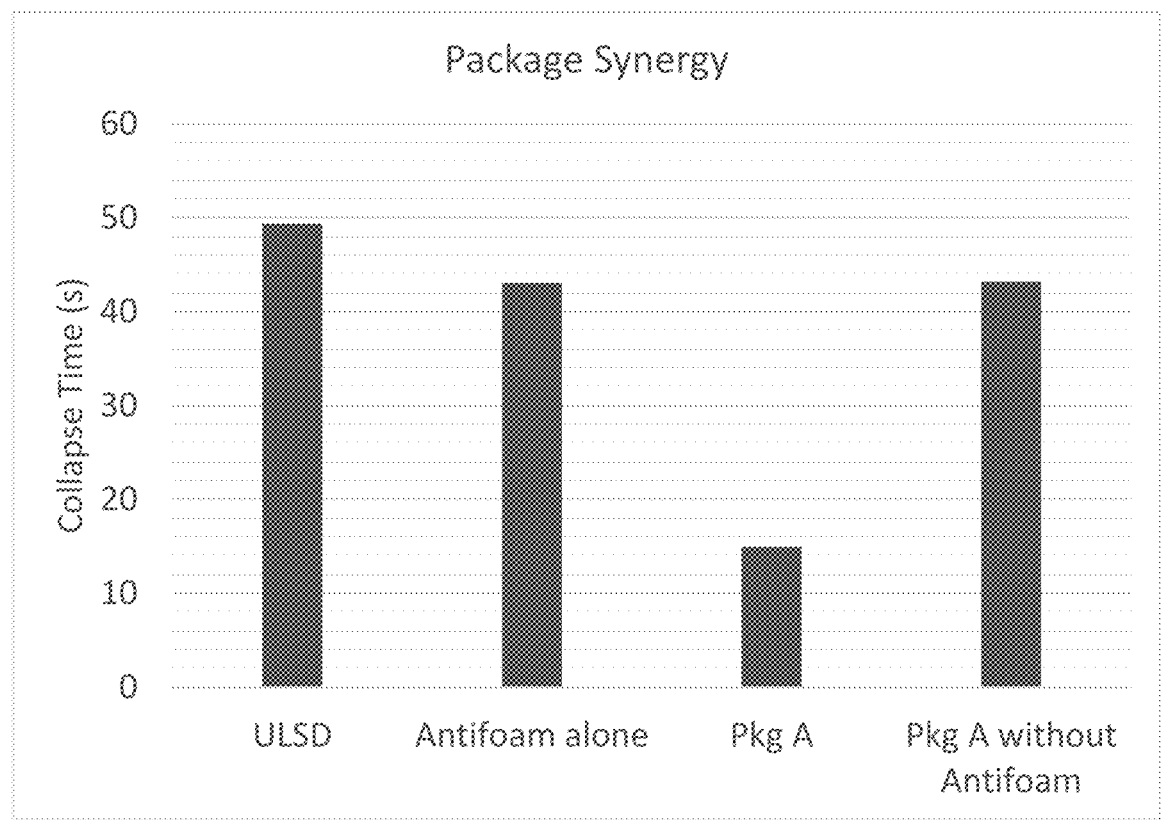
FIG. 4 is a graph illustrating the synergistic effect a TBAT:EHAT antifoam has with in an additive package (Additive Package A) on foam collapse time.

Applicants also surprisingly discovered that the antifoams have a synergistic effect with mixed with one or more fuel additives in a fuel additive package. FIG. 3 is a graph showing the foam collapse time, Max Height, and Max Foam of Additive Package A with a TBAT:EHAT antifoam at different ratios. FIG. 4 is a graph illustrating the synergistic effect a TBAT:EHAT antifoam has with in an additive package (Additive Package A) on foam collapse time.

Additional suitable test methods for measuring the effectiveness of the poly(acrylate) polymers disclosed herein at reducing foam in diesel fuels include the "Determination of the foaming tendency of diesel fuels" NF M 07-075, published and distributed by l'Association Francaise de Normalisation (AFNOR—www.afnor.org).

Each of the documents referred to above is incorporated herein by reference, including any prior applications, whether or not specifically listed above, from which priority is claimed. The mention of any document is not an admission that such document qualifies as prior art or constitutes the general knowledge of the skilled person in any jurisdiction. Except in the Examples, or where otherwise explicitly indicated, all numerical quantities in this description specifying amounts of materials, reaction conditions, molecular weights, number of carbon atoms, and the like, are to be understood as modified by the word "about." It is to be understood that the upper and lower amount, range, and ratio limits set forth herein may be independently combined. Similarly, the ranges and amounts for each element of the invention can be used together with ranges or amounts for any of the other elements. As used herein, the term "comprising" is intended also to encompass as alternative embodiments "consisting essentially of" and "consisting of." "Consisting essentially of" permits the inclusion of substances that do not materially affect the basic and novel characteristics of the composition under consideration.

What is claimed is:

1. A method of reducing foam in a diesel fuel, said method comprising adding from 2 ppm to 100 ppm of at least one poly(acrylate) polymer to the diesel fuel wherein the at least one poly(acrylate) polymer is prepared by polymerizing:
   (i) a (meth)acrylate monomer comprising tertiary butyl (meth)acrylate; and
   (ii) a (meth)acrylate monomer comprising trimethylhexyl (meth)acrylate and/or 2-ethylhexyl (meth)acrylate; and
   wherein the ratio of monomer (i) to monomer (ii) ranges from 90:10 to 98:02; and
   wherein the at least one poly(acrylate) polymer has a weight average molecular weight ("$M_w$") from 10,000 to 350,000 Da.

2. A method of reducing foam in a diesel fuel, said method comprising adding from 2 ppm to 100 ppm of at least one poly(acrylate) polymer to the diesel fuel, wherein the at least one poly(acrylate) polymer is prepared by polymerizing:
   (i) a (meth)acrylate monomer comprising tertiary butyl (meth)acrylate;
   (ii) a (meth)acrylate monomer comprising trimethylhexyl (meth)acrylate and/or 2-ethylhexyl (meth)acrylate; and
   (iii) at least one additional monomer comprising $C_1$ to $C_{30}$ alkyl esters of (meth)acrylic acid, or combinations thereof; and
   wherein the ratio of monomer (i) to monomer (ii) to the at least one additional monomer (iii) ranges from 85:11:4 to 85:4:11; and
   wherein the at least one poly(acrylate) polymer has a weight average molecular weight ("$M_w$") from 10,000 to 350,000 Da.

3. The method of claim 2, wherein the at least one additional monomer comprises ethyl (meth)acrylate.

* * * * *